United States Patent
Ranjeva et al.

(10) Patent No.: US 12,052,043 B2
(45) Date of Patent: Jul. 30, 2024

(54) PROTECTIVE CASE ATTACHED WITH ANCHORS

(71) Applicant: Otter Products, LLC, Fort Collins, CO (US)

(72) Inventors: Minna L. Ranjeva, San Diego, CA (US); Richard W. Vinson, Fort Collins, CO (US); Jason Sagen, Fort Collins, CO (US); Todd Eichinger, Fort Collins, CO (US); Bryan W. Goings, Fort Collins, CO (US)

(73) Assignee: Otter Products, LLC, Fort Collins, CO (US)

( * ) Notice: Subject to any disclaimer, the term of this patent is extended or adjusted under 35 U.S.C. 154(b) by 421 days.

(21) Appl. No.: 17/675,797

(22) Filed: Feb. 18, 2022

(65) Prior Publication Data

US 2022/0278706 A1    Sep. 1, 2022

Related U.S. Application Data

(60) Provisional application No. 63/154,890, filed on Mar. 1, 2021.

(51) Int. Cl.
*H04B 1/3888* (2015.01)
*H04M 1/02* (2006.01)
(Continued)

(52) U.S. Cl.
CPC ............ *H04B 1/3888* (2013.01); *H04M 1/04* (2013.01)

(58) Field of Classification Search
CPC ...... H04B 1/3888; H04M 1/04; H04M 1/185; H04M 1/0214
(Continued)

(56) References Cited

U.S. PATENT DOCUMENTS

| 4,984,706 A | 1/1991 | Cadwell et al. |
| 5,632,373 A | 5/1997 | Kumar et al. |

(Continued)

FOREIGN PATENT DOCUMENTS

| GB | 2521152 A | 6/2015 | |
| KR | 20130116565 A | * 10/2013 | ............... H04B 1/04 |

(Continued)

OTHER PUBLICATIONS

U.S. Appl. No. 16/657,557, filed Oct. 18, 2019, Ryan J. Cavenagh.

*Primary Examiner* — Inder P Mehra

(57) ABSTRACT

A protective case for an electronic device comprises a first anchor, a first case portion, a second anchor, and a second case portion. The first anchor adheres to a housing of a first portion of the electronic device. The first anchor includes a slot. The first case portion includes a body having an aperture, wherein the first anchor is configured to extend through the aperture. The first case portion also includes a peg slidably captured in the body to engage the slot of the first anchor. The second anchor adheres to a housing of a second portion of the device. The second anchor includes a slot. The second case portion includes a body having an aperture, wherein the second anchor is configured to extend through the aperture. The second case portion also includes a peg slidably captured in the body to engage the slot of the second anchor.

20 Claims, 18 Drawing Sheets

(51) Int. Cl.
*H04M 1/04* (2006.01)
*H04M 1/18* (2006.01)

(58) Field of Classification Search
USPC ....................................... 455/575.8
See application file for complete search history.

(56) References Cited

U.S. PATENT DOCUMENTS

| | | | |
|---|---|---|---|
| 5,966,647 | A | 10/1999 | Sawai |
| 6,109,434 | A | 8/2000 | Howard, Jr. |
| 6,267,236 | B1 | 7/2001 | Seok |
| 7,343,184 | B2 | 3/2008 | Rostami |
| 7,355,338 | B2 | 4/2008 | Osame et al. |
| 7,444,176 | B2 | 10/2008 | Oda et al. |
| 7,609,512 | B2 | 10/2009 | Richardson et al. |
| 7,850,032 | B2 | 12/2010 | Carnevali et al. |
| 7,886,903 | B1 | 2/2011 | Wurzelbacher, Jr. et al. |
| 7,933,122 | B2 | 4/2011 | Richardson et al. |
| 8,261,933 | B2 | 9/2012 | Kidd et al. |
| 8,310,826 | B2 | 11/2012 | Wu et al. |
| 8,498,103 | B2 | 7/2013 | Graneto, III |
| 8,965,458 | B2 | 2/2015 | Richardson et al. |
| 9,025,317 | B2 | 5/2015 | Richardson et al. |
| 9,232,674 | B2 | 1/2016 | Wang et al. |
| 9,735,595 | B2 | 8/2017 | Colahan et al. |
| 10,064,298 | B2 | 8/2018 | Cavenagh et al. |
| 10,216,222 | B2 | 2/2019 | Fenton et al. |
| 10,314,185 | B2 | 6/2019 | Cavenagh et al. |
| 10,585,458 | B2 | 3/2020 | Park et al. |
| 10,845,844 | B1 | 11/2020 | Chan et al. |
| 10,849,241 | B2 | 11/2020 | Cavenagh et al. |
| 10,884,453 | B2 | 1/2021 | Armstrong |
| 10,928,854 | B1 | 2/2021 | Fenton et al. |
| 2002/0065054 | A1 | 5/2002 | Humphreys et al. |
| 2003/0095374 | A1 | 5/2003 | Richardson |
| 2003/0114184 | A1 | 6/2003 | Wilson |
| 2004/0180706 | A1 | 9/2004 | Pan |
| 2004/0256535 | A1 | 12/2004 | Desch |
| 2004/0262179 | A1 | 12/2004 | Gartrell et al. |
| 2005/0045505 | A1 | 3/2005 | Vandevenne et al. |
| 2005/0139498 | A1 | 6/2005 | Goros |
| 2006/0160586 | A1 | 7/2006 | Cheng |
| 2006/0175370 | A1 | 8/2006 | Arney et al. |
| 2006/0177048 | A1 | 8/2006 | Tsutaichi et al. |
| 2006/0198513 | A1 | 9/2006 | Eldon |
| 2006/0226040 | A1 | 10/2006 | Medina |
| 2007/0201689 | A1 | 8/2007 | Uramoto et al. |
| 2007/0205122 | A1 | 9/2007 | Oda et al. |
| 2008/0032758 | A1 | 2/2008 | Rostami |
| 2008/0053851 | A1 | 3/2008 | Ko et al. |
| 2008/0083631 | A1 | 4/2008 | Tsang et al. |
| 2008/0121321 | A1 | 5/2008 | Tiner et al. |
| 2008/0125197 | A1 | 5/2008 | Hongo et al. |
| 2008/0302687 | A1 | 12/2008 | Sirichai et al. |
| 2009/0009945 | A1 | 1/2009 | Johnson et al. |
| 2009/0032421 | A1 | 2/2009 | Sween et al. |
| 2009/0034169 | A1 | 2/2009 | Richardson et al. |
| 2009/0050499 | A1 | 2/2009 | Calco et al. |
| 2009/0194445 | A1 | 8/2009 | Mongan et al. |
| 2009/0211775 | A1 | 8/2009 | Yamaguchi et al. |
| 2009/0233658 | A1 | 9/2009 | Murayama et al. |
| 2009/0236246 | A1 | 9/2009 | Ai |
| 2009/0314400 | A1 | 12/2009 | Liu |
| 2010/0096284 | A1 | 4/2010 | Bau |
| 2010/0110629 | A1 | 5/2010 | Dietz et al. |
| 2010/0122924 | A1 | 5/2010 | Andrews |
| 2010/0238119 | A1 | 9/2010 | Dubrovsky et al. |
| 2011/0157800 | A1 | 6/2011 | Richardson et al. |
| 2011/0228459 | A1 | 9/2011 | Richardson et al. |
| 2011/0267757 | A1 | 11/2011 | Probst et al. |
| 2012/0043234 | A1 | 2/2012 | Westrup |
| 2012/0088557 | A1 | 4/2012 | Liang |
| 2012/0154288 | A1 | 6/2012 | Walker |
| 2012/0199501 | A1 | 8/2012 | Gette et al. |
| 2012/0261304 | A1 | 10/2012 | Busri |
| 2014/0043737 | A1 | 2/2014 | Chen et al. |
| 2014/0262848 | A1 | 9/2014 | Fathollahi et al. |
| 2014/0262875 | A1 | 9/2014 | Carnevali |
| 2014/0263939 | A1 | 9/2014 | Rinner |
| 2015/0031223 | A1 | 1/2015 | Liao |
| 2015/0156297 | A1 | 6/2015 | Crawford et al. |
| 2015/0257285 | A1 | 9/2015 | Wilson et al. |
| 2015/0296942 | A1 | 10/2015 | Sirichai |
| 2016/0139635 | A1 | 5/2016 | Gibson et al. |
| 2016/0162112 | A1 | 6/2016 | Lee et al. |
| 2016/0234951 | A1 | 8/2016 | Chen et al. |
| 2016/0299532 | A1 | 10/2016 | Gheorghiu et al. |
| 2016/0381014 | A1 | 12/2016 | Kim |
| 2017/0054466 | A1 | 2/2017 | Flores et al. |
| 2017/0250719 | A1 | 8/2017 | Stryker et al. |
| 2017/0257961 | A1 | 9/2017 | Chen et al. |
| 2018/0139857 | A1 | 5/2018 | Cavenagh et al. |
| 2018/0348817 | A1 | 12/2018 | Armstrong |
| 2019/0228208 | A1 | 7/2019 | Cho et al. |
| 2020/0412401 | A1 | 12/2020 | Kim et al. |
| 2021/0244144 | A1 | 8/2021 | Cavenagh et al. |
| 2021/0303033 | A1 | 9/2021 | Hong et al. |

FOREIGN PATENT DOCUMENTS

| | | | |
|---|---|---|---|
| WO | 1994000037 | A1 | 1/1994 |
| WO | 1999041958 | A1 | 8/1999 |
| WO | 2011067921 | A1 | 6/2011 |

\* cited by examiner

PROTECTIVE CASE ATTACHED WITH ANCHORS

CROSS-REFERENCE TO RELATED APPLICATIONS

The present application claims priority to U.S. Provisional Patent Application No. 63/154,890, filed Mar. 1, 2021, which is hereby incorporated by reference in its entirety.

FIELD

The present disclosure relates to cases, covers, and/or encasements for use with electronic devices.

BACKGROUND

Portable electronic devices are commonly used for communication and entertainment purposes. Portable electronic devices include devices such as smartphones, cellular phones, mobile communication devices, computers, portable computing devices, mobile computing devices, tablet computers, cameras, video players, smart watches, audio players, electronic media readers, two-way radios, global positioning satellite (GPS) devices, measurement instruments, and/or other types of electronic, computing, or communication devices, including combinations thereof. Cases, protective cases, covers, protective covers, enclosures, or encasements are sometimes installed on or over the existing housings of these types of electronic devices in order to protect the electronic devices from damage due to exposure to shock, impact, dropping, puncture, dust, dirt, water, snow, rain, mud, chemicals, and/or other potentially damaging forces or elements. The term "case" is used herein to refer to any type of case, cover, protective case, protective cover, enclosure, encasement, shell, or combination thereof. Cases are also sometimes used to supplement the functionality of the device and/or to change the aesthetics of the device.

There is an increasing number of foldable electronic devices coming to market. These may include folding smartphones and/or folding tablet computers. These devices often fold into a smaller footprint or volume when not in use. Where traditional electronic devices often just snap into protective case, it is more challenging to design protective cases which attach to foldable devices. Often these cases have two or more parts that slide onto the foldable device, but it is challenging to get the case parts to remain attached to the device because, to accommodate the hinge, folding, and display, each case part is sometimes not able to grasp the device or edges of the device from all directions. In addition, the sizes of display screens on electronic devices have increased. Bezels around the display screens on the fronts of electronic devices have grown smaller as the display screens have been extended closer to one or more edges of the electronic devices. This shrinking or absence of bezels along with the folding nature of the devices makes it more difficult to keep the parts of the protective cases attached to the electronic devices. Improved systems, apparatuses, and methods of solving these and other problems are disclosed herein.

BRIEF DESCRIPTION OF THE DRAWINGS

The present invention will be described and explained through the use of the accompanying drawings in which.

DETAILED DESCRIPTION

Figure 1A:
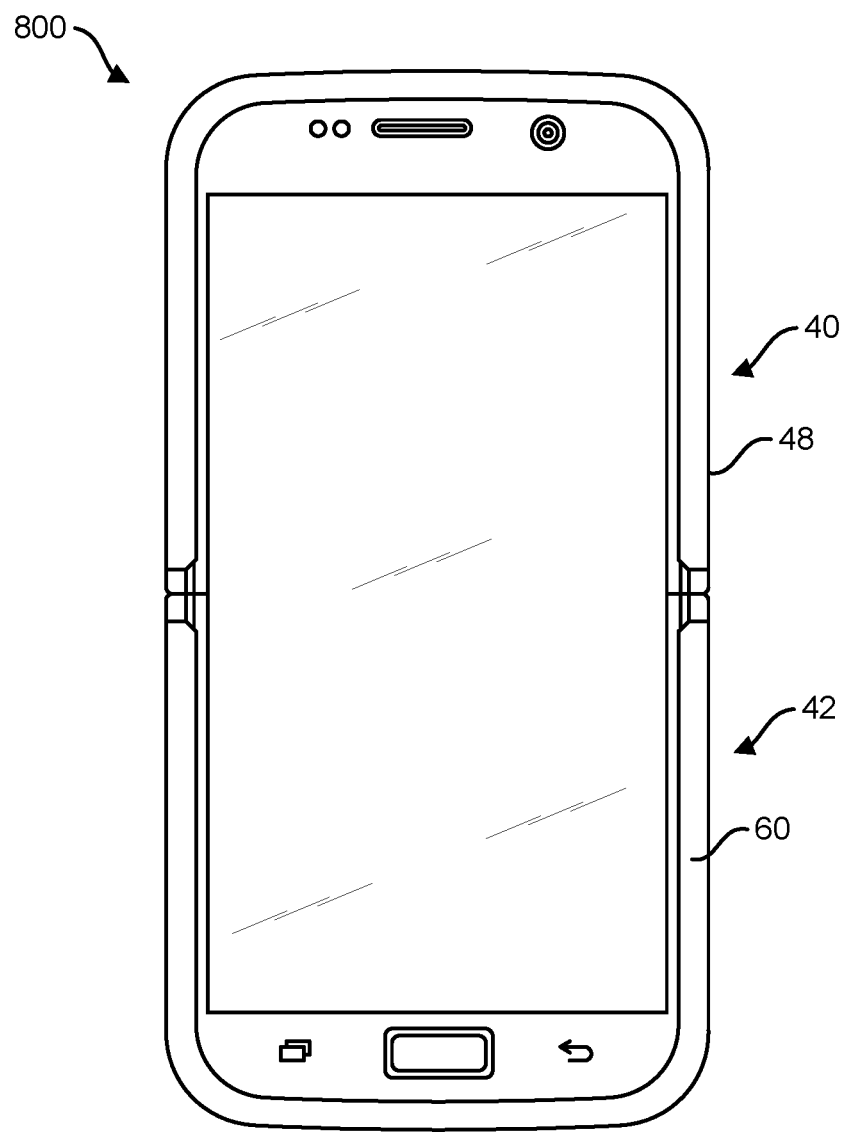
FIG. 1A illustrates a folding electronic device installed in a case.

In the following detailed description, various specific details are set forth in order to provide an understanding of and describe the apparatuses and techniques introduced here. However, the techniques may be practiced without the specific details set forth in these examples. Various alternatives, modifications, and/or equivalents will be apparent to those skilled in the art without varying from the spirit of the introduced apparatuses and techniques. For example, while the embodiments described herein refer to particular features, the scope of this solution also includes embodiments having different combinations of features and embodiments that do not include all of the described features. Accordingly, the scope of the techniques and solutions introduced herein are intended to embrace all such alternatives, modifications, and variations as fall within the scope of the claims, together with all equivalents thereof. Therefore, the description should not be taken as limiting the scope of the invention, which is defined by the claims.

In one example, a protective case for a foldable electronic device comprises a first anchor, a first case portion, a second anchor, and a second case portion. The first anchor is adapted or configured to be adhered to a housing of a first portion of the foldable electronic device with an adhesive. The first anchor includes a slot. The first case portion is configured to cover at least a portion of the housing of the first device portion. The first case portion includes a body having an aperture, wherein the first anchor is configured to extend through the aperture when the first case portion is on the housing of the first device portion. The first case portion also includes a peg slidably captured in the body, wherein the peg is configured to engage the slot of the first anchor when in a latched position to removably retain the first case portion to the first device portion. The second anchor is configured to be adhered to a housing of a second portion of the device with an adhesive. The second anchor includes a slot. The second case portion is configured to cover at least a portion of the housing of the second device portion, wherein the second case portion is not attached to the first case portion. The second case portion includes a body having an aperture, wherein the second anchor is configured to extend through the aperture when the second case portion is on the housing of the second device portion. The second case portion also includes a peg slidably captured in the body, wherein the peg is configured or adapted to engage the slot of the second anchor when in a latched position to removably retain the second case portion to the second device portion.

Some of the cases described herein are described as protective cases. However, the apparatuses and techniques disclosed herein are not to be limited to any particular protective characteristic of the case and may be applicable to various types of cases, covers, and/or encasements which cover an electronic device either partially or fully and may not have any particular protective characteristic. The techniques disclosed herein may be applied to any type of case for a folding device including, but not limited to those, disclosed in U.S. Pat. No. 10,492,318, which is hereby incorporated by reference.

Figure 1B:
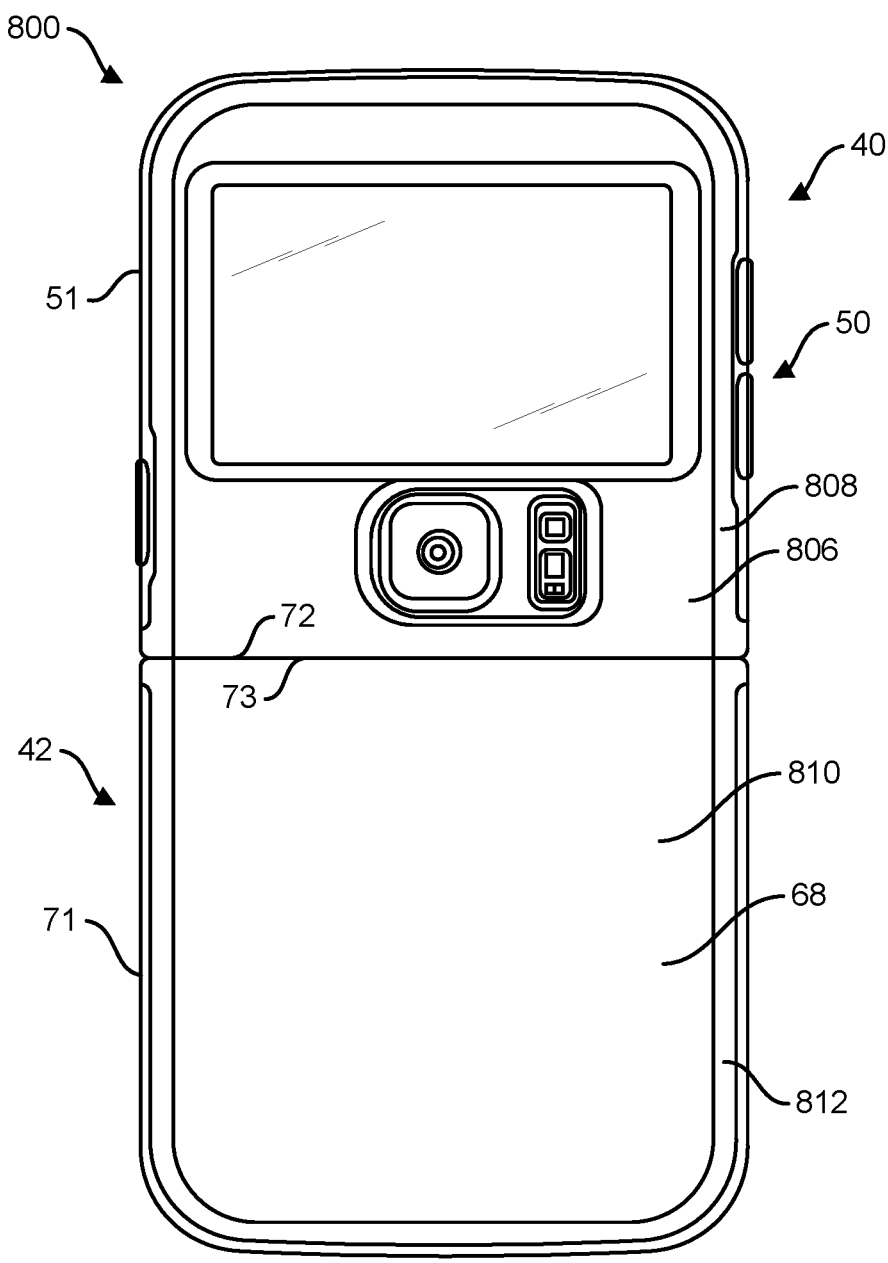
FIG. 1B illustrates the device and case of FIG. 1A from the opposite side.

FIG. 1A illustrates an exemplary protective case 800 installed on a folding electronic device that is in an opened position. FIG. 1B illustrates an opposite side of the view of FIG. 1A. The electronic device may be a cellular phone, smartphone, mobile communication device, mobile computing device, portable computing device, tablet, phablet (phone/tablet), portable computer, personal video player, electronic media reader, audio player, handheld scanner, camera, GPS device, or electronic computing or communication device of another type, including combinations thereof.

Protective case 800 may comprise any type of protective shell, cover, covering, enclosure, bumper, frame, sheath, encasement, member, and/or a combination thereof. Protective case 800 may provide protection against forces or damaging elements such as shock, impact, dropping, puncture, dust, dirt, heat, cold, water, snow, rain, mud, fluids chemicals, and/or other potentially damaging elements. In various instances, protective case 800 may be waterproof, watertight, and/or water-resistant. In other examples, techniques disclosed herein may implemented in the form of a cover for an electronic device which provides some or all of the functions disclosed herein while having little or no protective characteristics. Protective case 800 may also include one or more cushion members, cushion layers, cushion liners, and/or cushion portions that are removably attached or permanently attached to any combination of the one, two, or more members. Any portion of protective case 800 may be made of any suitable material, including, but not limited to, polycarbonate (PC), high impact polystyrene (HIPS), nylon, fiberglass-filled nylon, acrylonitrile butadiene styrene (ABS), polyoxymethylene (POM), polyethylene terephthalate (PET), ceramic, metallized ceramic, aluminum, aluminum alloy, titanium, wood, carbon fiber, and/or any combination thereof. The techniques disclosed herein are not to be limited to any particular type, structure, or configuration of case.

Figure 1C:
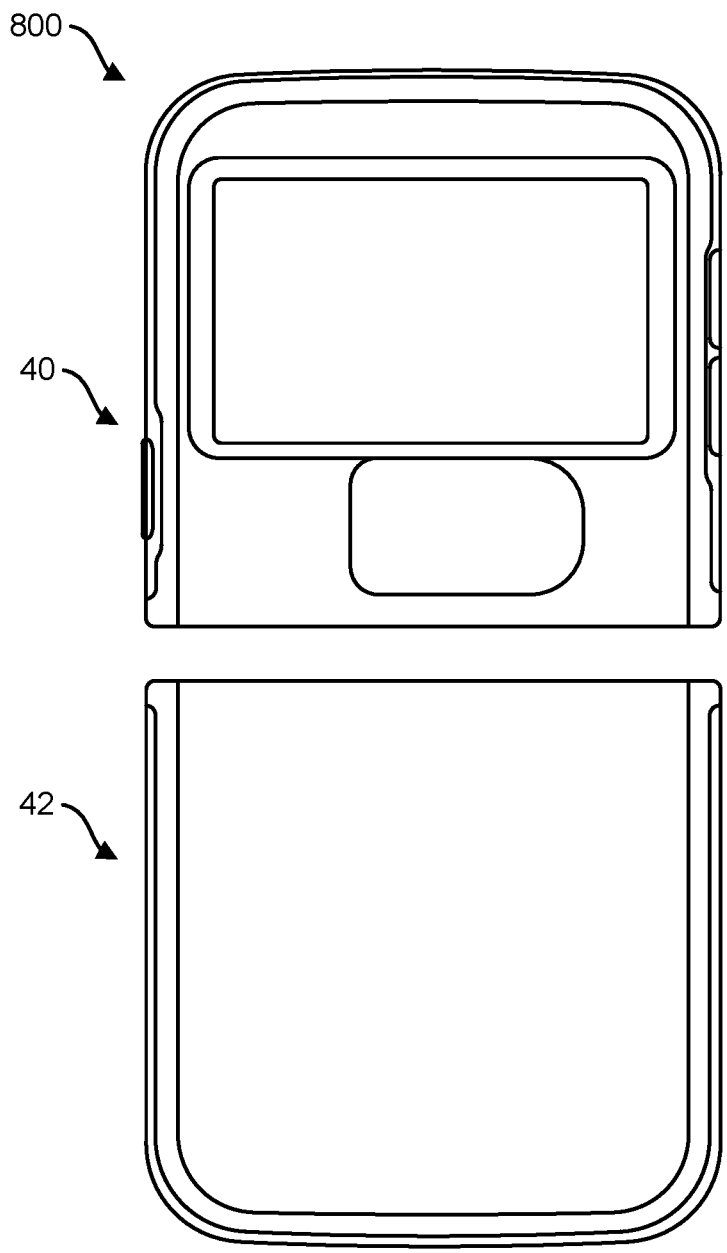
FIG. 1C illustrates the case of FIG. 1A.

The protective case 800 may include a first case portion 40 which may be removable, detachable, and/or not connected to a second case portion 42. Specifically, as illustrated in FIG. 1C, protective case 800 (without the encased electronic device) the first case portion 40 and the second case portion 42 may be separate pieces. The fact that first case portion 40 and the second case portion 42 are separate pieces makes it significantly easier to install protective case 800 on a folding electronic device and also reduces or eliminates potential binding or tension which may occur around the hinge area of the electronic device when it is opened and closed. However, since each of first case portion 40 and second case portion 42 slide onto alternative sides of the electronic device and may not capture an edge or side of the electronic device in the hinge area, it may be challenging to keep first case portion 40 and second case portion 42 attached, or removably attached, to the electronic device.

The examples which follow illustrate various methods of removably attaching a case or a case portion, such as first case portion 40 or second case portion 42 to an electronic device. Each of the examples which follow provides a cross-sectional, closeup view of the attachment mechanism for purposes of description and does not show the entire case or the entire electronic device. The techniques disclosed in the examples may be applied to any case and/or any electronic device.

Figure 2A:
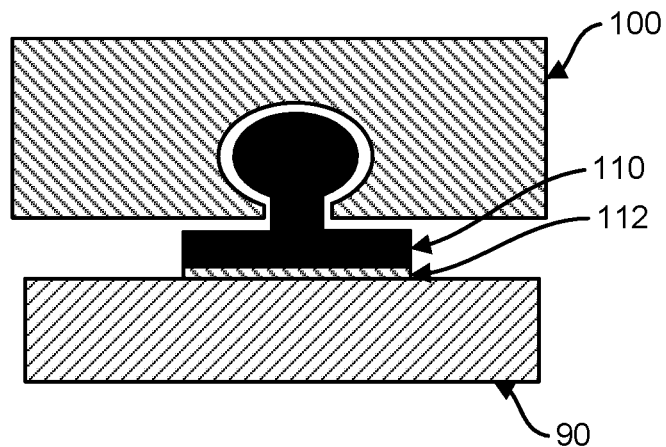
FIG. 2A illustrates an apparatus and method of attaching a case to an electronic device.

FIG. 2A illustrates a closeup view of a case 100 attached to a phone 90. Case 100 may be any type of case and may be an example of case 800, first case portion 40, and/or second case portion 42. Phone 90 may be any type of electronic device to which a case is being attached.

Figure 2B:
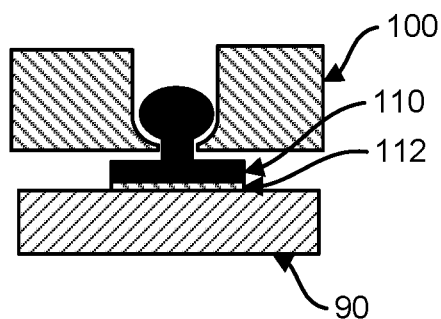
FIG. 2B illustrates a variation of the apparatus and method of FIG. 2A.

As illustrated in the closeup cross sectional view of FIG. 2A, an anchor 110 with a head is attached to phone 90 with an adhesive 112. Case 100 is removably attached to the anchor 110 by pressing, squeezing, or forcing case 100 onto anchor 110 such that a pliable, stretchable, or resilient material of case 100 captures anchor 110 in a cavity or recess by stretching around the head of anchor 110 thereby removably attaching case 100 to phone 90. A plurality of anchors 110 will typically be attached to phone 90 in various locations to create a plurality of attachment points. Case 100 can be removed and reattached as needed. FIG. 2B illustrates a variation in which the cavity or recess in case 100 for the head of anchor 110 is open on top. Adhesive 112 may be permanent, semi-permanent, temporary, and/or removable.

Figure 2C:
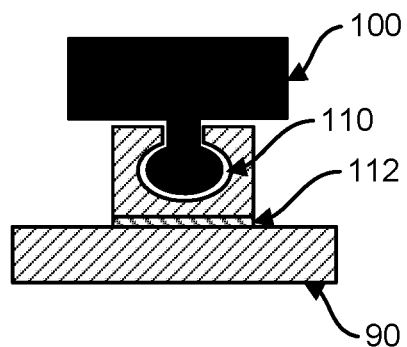
FIG. 2C illustrates a variation of the apparatus and method of FIGS. 2A and 2B.

FIG. 2C illustrates an alternate embodiment in which anchor 110 is attached to part of case 100 and is inserted into a cavity or recess that is attached to phone 90 with adhesive 112. Anchor 110 and/or the recess area may be formed from a flexible, compliant, or resilient material.

Figure 3:
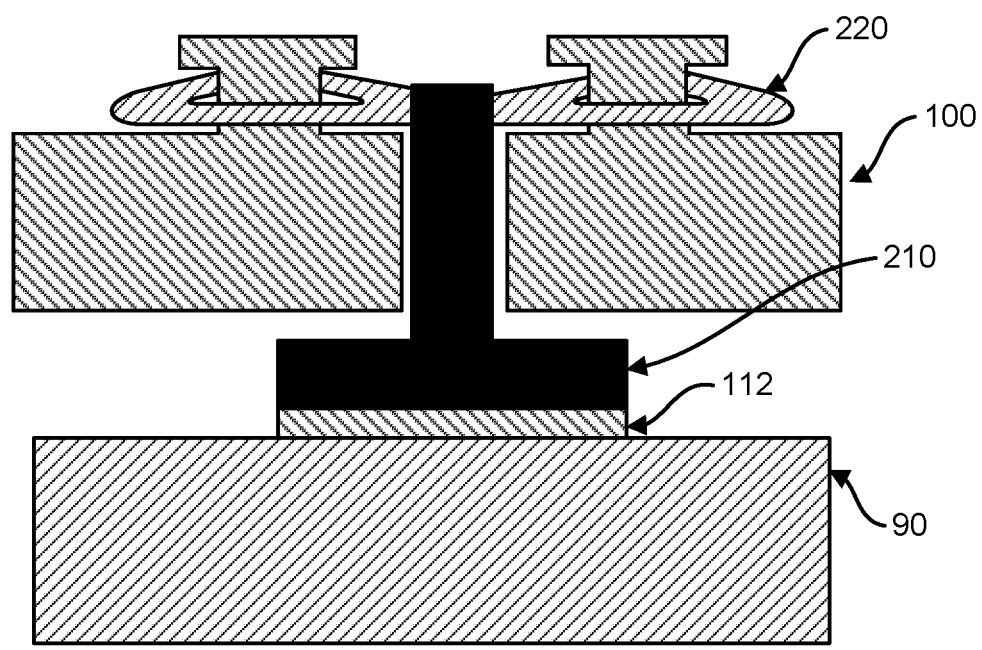
FIG. 3 illustrates an apparatus and method of attaching a case to an electronic device.

FIG. 3 illustrates a closeup, cross-sectional view of an alternate method of removably attaching case 100 to phone 90. An anchor 210 is attached to phone 90 using adhesive 112 and extends through an opening, hole, or aperture in case 100. A top end of anchor 210 is attached to posts or protrusions on case 100 using one or more loops 220. Loops 220 may be formed from a stretchable or resilient material. Alternately, loops 220 may be permanently attached to case 100 and temporarily attached to anchor 210. A plurality of anchors 210 may be used.

Figure 4A:
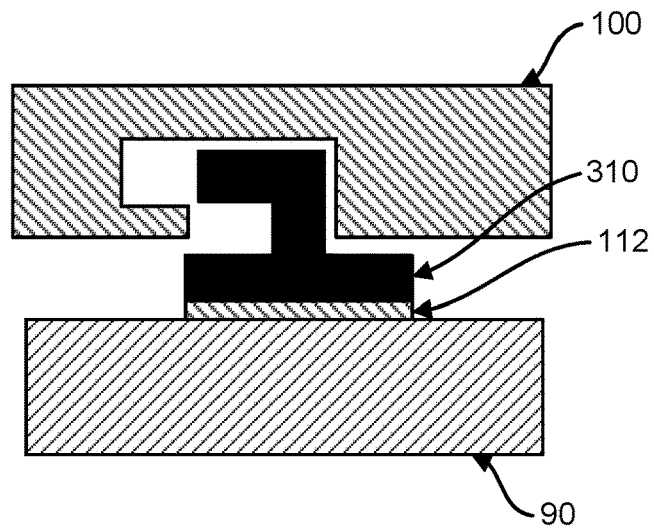
FIG. 4A illustrates an apparatus and method of attaching a case to an electronic device.
Figure 4B:
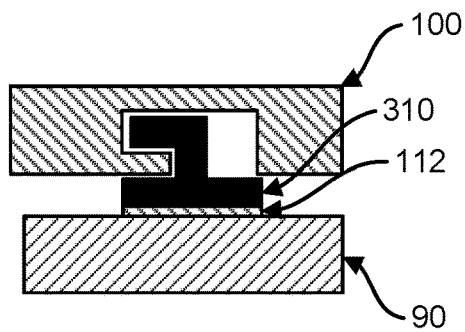
FIG. 4B illustrates the apparatus and method of FIG. 4A in the engaged position.
Figure 4C:
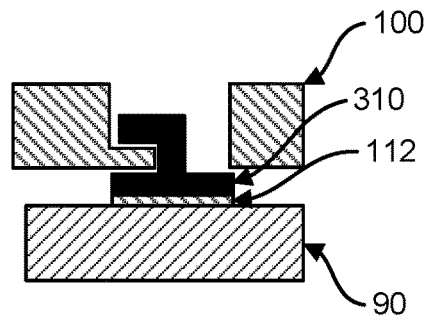
FIG. 4C illustrates a variation of the apparatus and method of FIG. 4A.

FIG. 4A illustrates a closeup, cross-sectional view of an alternate method of removably attaching case 100 to phone 90. An anchor 310 is attached to phone 90 using adhesive 112. Anchor 310 includes an angled, bent, or curved arm that extends into a cavity of case 100 which has a corresponding lip. FIG. 4B illustrates anchor 310 in an engaged position after case 100 is slid laterally. FIG. 4C illustrates an alternate embodiment in which the cavity in case 100 is open on the top. A plurality of anchors 310 may be used.

Figure 5:
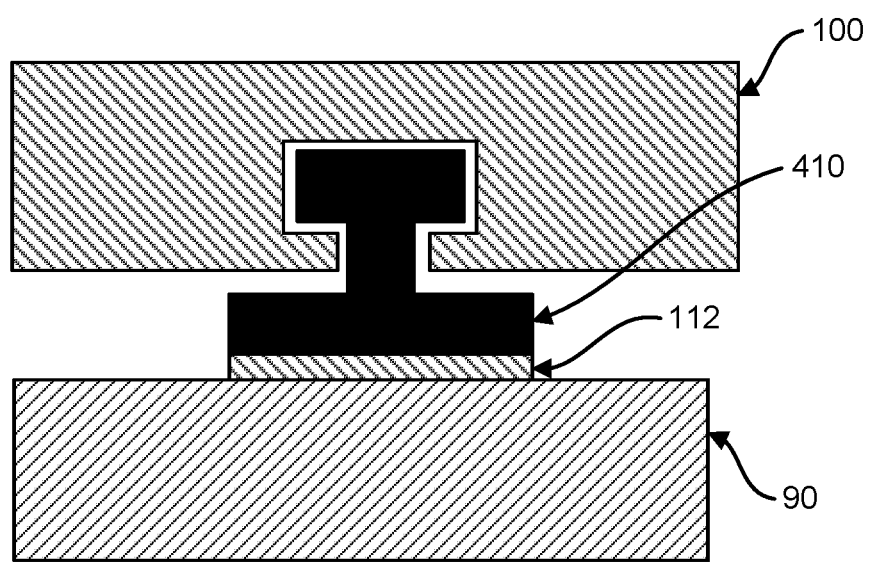
FIG. 5 illustrates an apparatus and method of attaching a case to an electronic device.

FIG. 5 illustrates a closeup, cross-sectional view of an alternate method of removably attaching case 100 to phone 90. An anchor 410 is attached to phone 90 using adhesive 112. Anchor 410 has a "T" shaped cross section and is forced or pressed into a stretchable or resilient cavity of case 100. The interaction may also utilize a friction fit or an interference fit. A sufficient external force must be applied to remove case 100 from anchor 410. A plurality of anchors 410 may be used.

Figure 6:
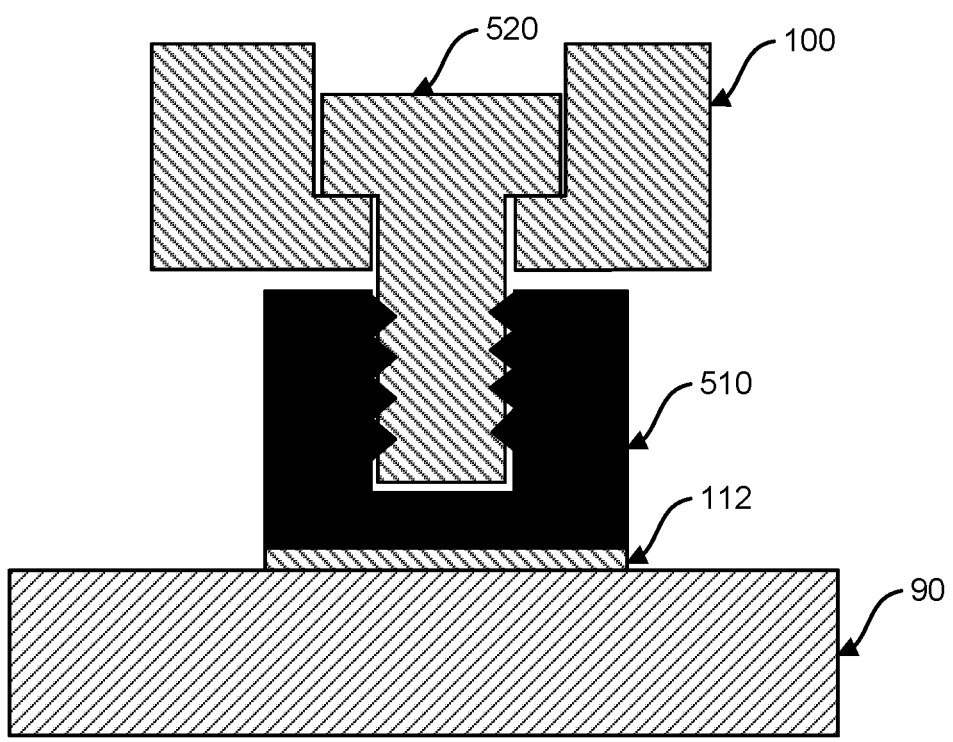
FIG. 6 illustrates an apparatus and method of attaching a case to an electronic device.

FIG. 6 illustrates a closeup, cross-sectional view of an alternate method of removably attaching case 100 to phone 90. An anchor 510 is attached to phone 90 using adhesive 112. Anchor 510 includes threads or other mechanical engagement features for receiving a fastener 520 inserted through case 100. In one example, fastener 510 is a threaded screw that engages threads in anchor 510. In other examples, an adhesive may be used on fastener 520. A plurality of anchors 510 and fasteners 520 may be used.

Figure 7:
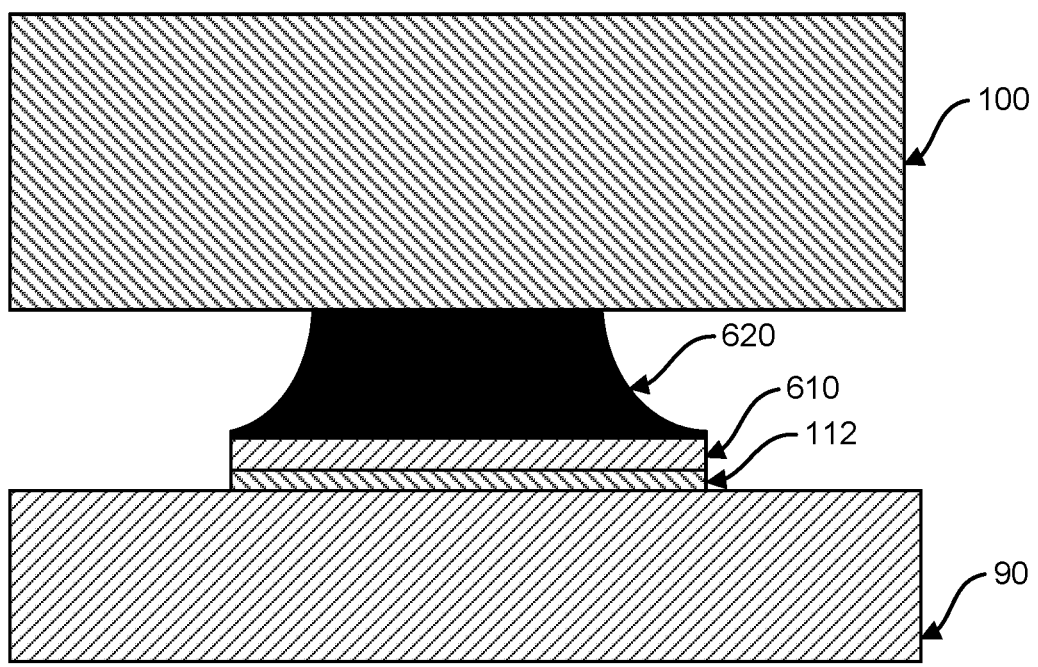
FIG. 7 illustrates an apparatus and method of attaching a case to an electronic device.

FIG. 7 illustrates a closeup, cross-sectional view of an alternate method of removably attaching case 100 to phone 90. An anchor 610 is attached to phone 90 using adhesive 112. Anchor 610 is attached to a suction mechanism 620 which temporarily adheres to case 100. In some examples, suction mechanism 620 may be attached to case 100 and may attach to anchor 610 or phone 90 through suction. A plurality of anchors 610 and suction mechanisms 620 may be used.

Figure 8:
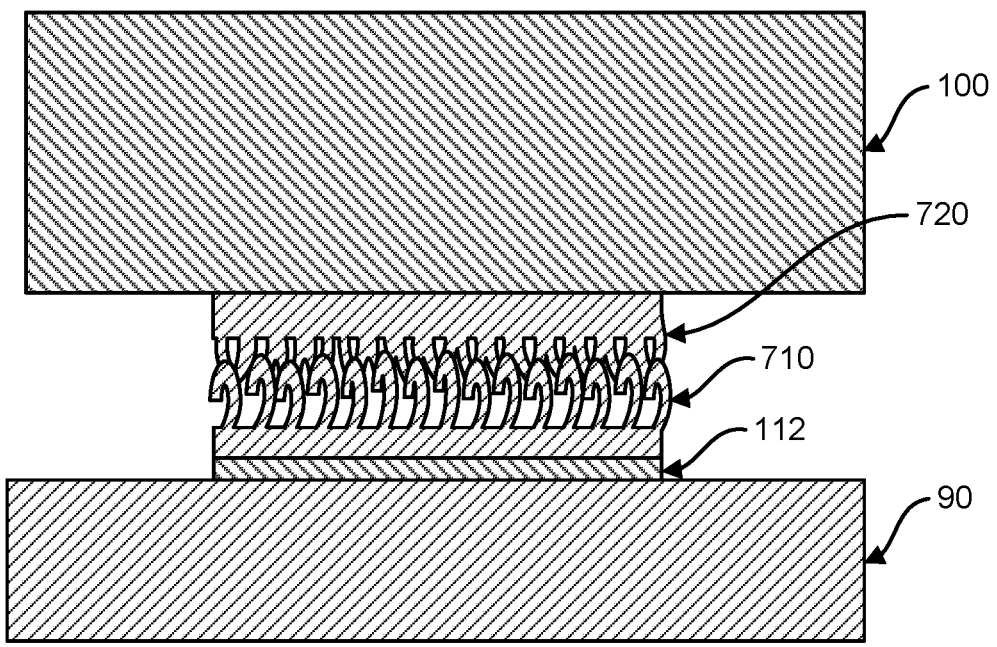
FIG. 8 illustrates an apparatus and method of attaching a case to an electronic device.

FIG. 8 illustrates a closeup, cross-sectional view of an alternate method of removably attaching case 100 to phone 90. A hook and loop fastener system including hook or loop 720 and loop or hook 710 are used to removably attach case 100 to phone 90. Either of hook or loop 720 and loop or hook 710 may be adhered to the respective component with adhesive 112 or may be molded as part of the respective component. A plurality of hook and loop fasteners may be used.

Figure 9B:
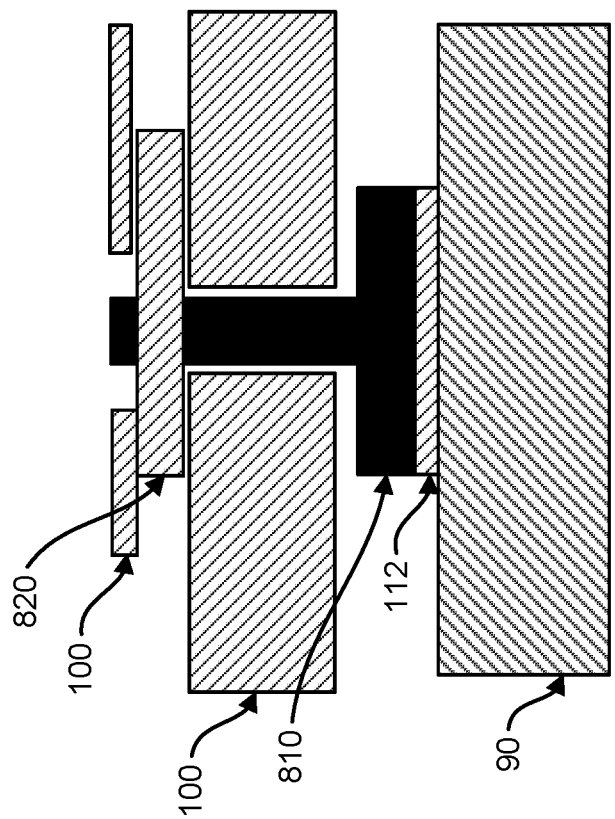
FIG. 9B illustrates the apparatus and method of FIG. 9A in the engaged position.
Figure 9A:
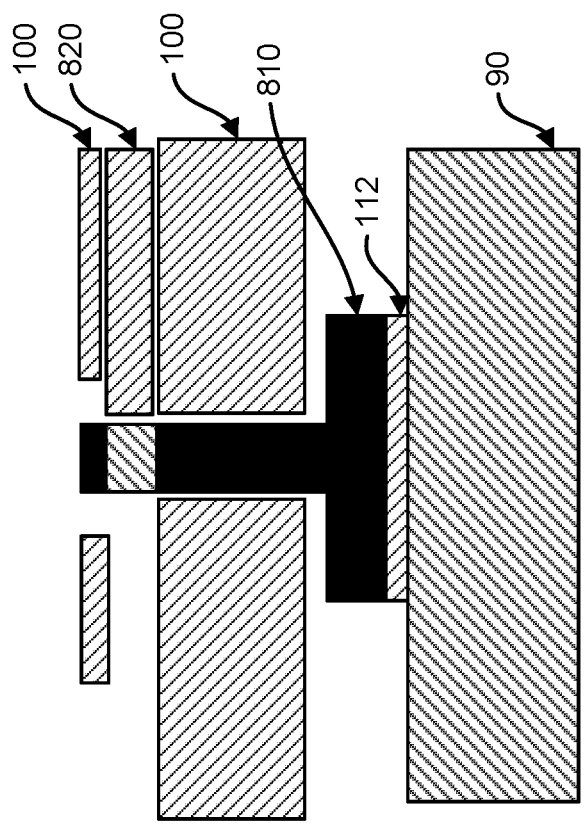
FIG. 9A illustrates an apparatus and method of attaching a case to an electronic device.

FIGS. 9A and 9B illustrate a closeup, cross-sectional view of an alternate method of removably attaching case 100 to phone 90. An anchor 810 is attached to phone 90 with adhesive 112. Anchor 810 extends through a hole, opening, or aperture in case 100 and includes a slot, channel, hole, or undercut. Case 100 includes a peg 820 which slides into the slot, channel, hole, or undercut in anchor 810 to attach case 100 to phone 90. FIG. 9A illustrates peg 820 in the unlatched position and FIG. 9B illustrates peg 820 in the latched position holding case 100 to phone 90. A plurality of anchors and pegs may be used.

Figure 10:
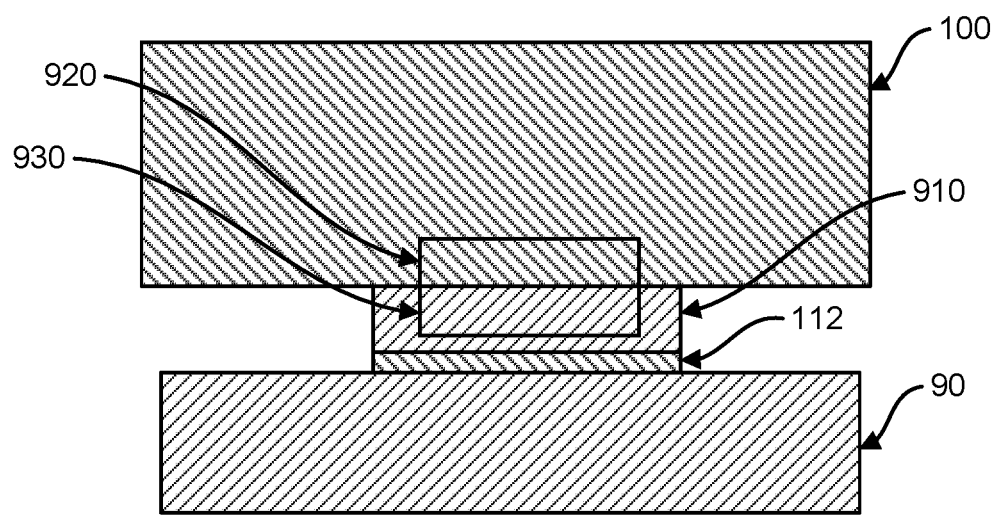
FIG. 10 illustrates an apparatus and method of attaching a case to an electronic device.

FIG. 10 illustrates a closeup, cross-sectional view of an alternate method of removably attaching case 100 to phone 90. A magnetic attachment system including magnetic and metallic elements. Magnet/metal element 920 is attached to case 100 and magnet/metal element 930 is attached to an anchor 910 which is attached to phone 90 with adhesive 112. Both of magnet/metal element 920 and magnet/metal element 930 may be magnets or one may be a magnet and the other a metallic element. In one variation, magnet/metal element 930 may be adhered directly to phone 90 without anchor 910. A plurality of magnets and metallic elements may be used.

Figure 11B:
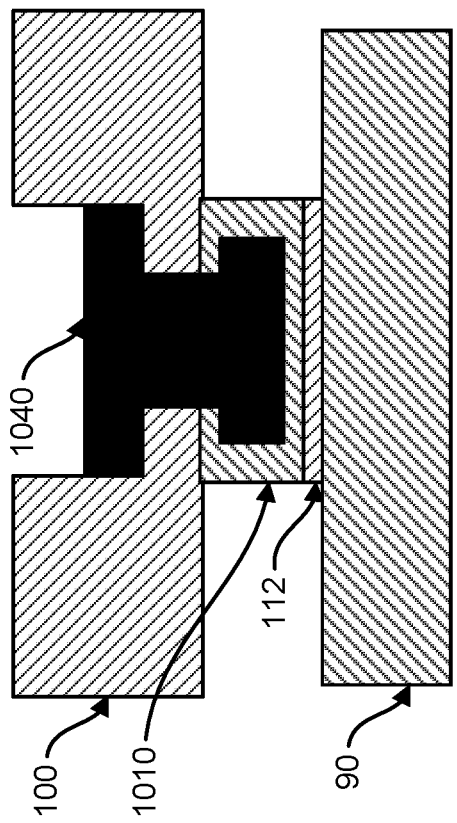
FIG. 11B illustrates the apparatus and method of FIG. 11A in the attached configuration.
Figure 11A:
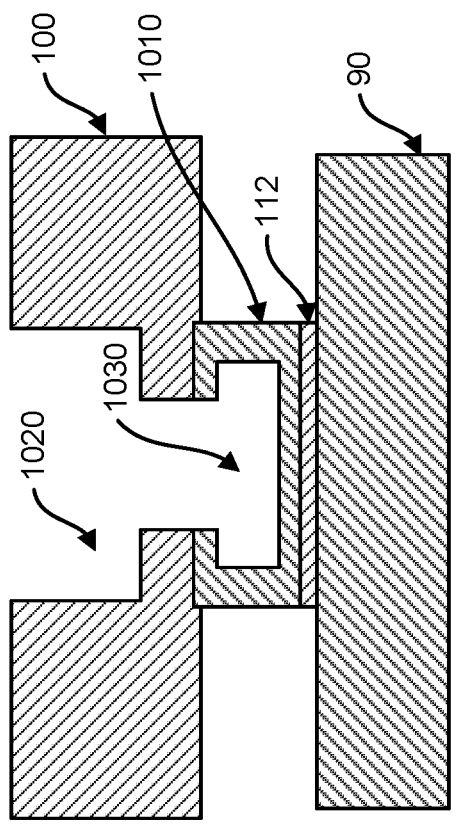
FIG. 11A illustrates an apparatus and method of attaching a case to an electronic device.

FIGS. 11A and 11B illustrate a closeup, cross-sectional view of an alternate method of removably attaching case 100 to phone 90. An anchor 1010 is attached to phone 90 with adhesive 112. Anchor 1010 includes a well 1030 with a shoulder inside of anchor 1010. Case 100 has an opening 1020 which also has a shoulder. FIG. 11A illustrates the initial state of well 1030 and opening 1020. In FIG. 11B, well 1030 and opening 1020 have been filled with a filler 1040. Filler 1040 cures to a hardened, semi-hardened, firm, or gummy state that retains case 100 to anchor 1010, due to the shoulders in each section, and consequently to phone 90.

Figure 12:
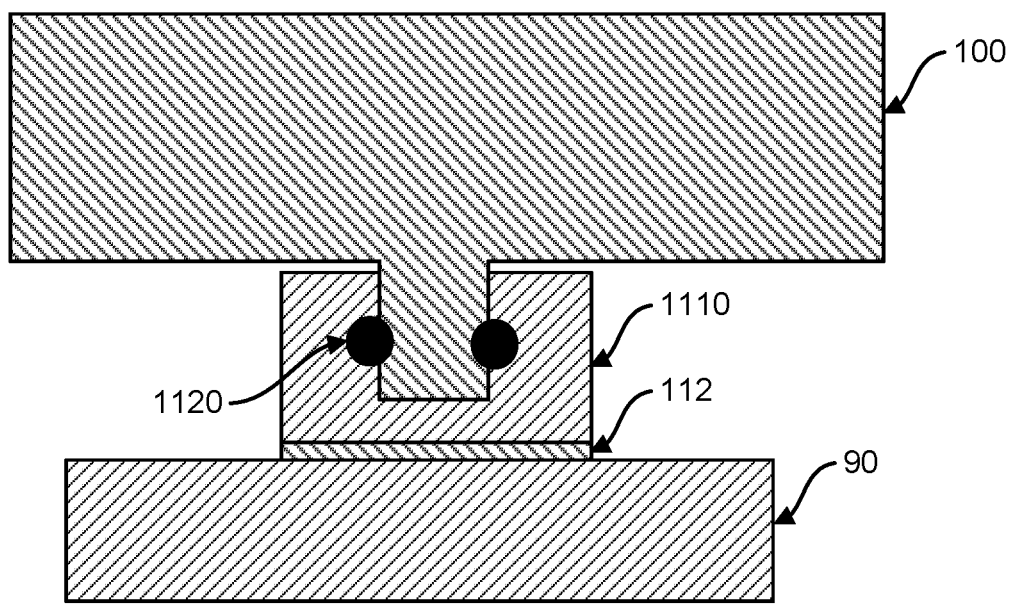
FIG. 12 illustrates an apparatus and method of attaching a case to an electronic device.

FIG. 12 illustrates a closeup, cross-sectional view of an alternate method of removably attaching case 100 to phone 90. Case 100 includes an inward facing post or protrusion having a groove. Anchor 1110 is attached to phone 90 with adhesive 112. An o-ring 1120 is seated in the grooves and retains the post of case 100 in anchor 1110 until a sufficient force is applied to compress o-ring 1120. Multiple posts, anchor, and o-ring sets may be used.

Figure 13A:
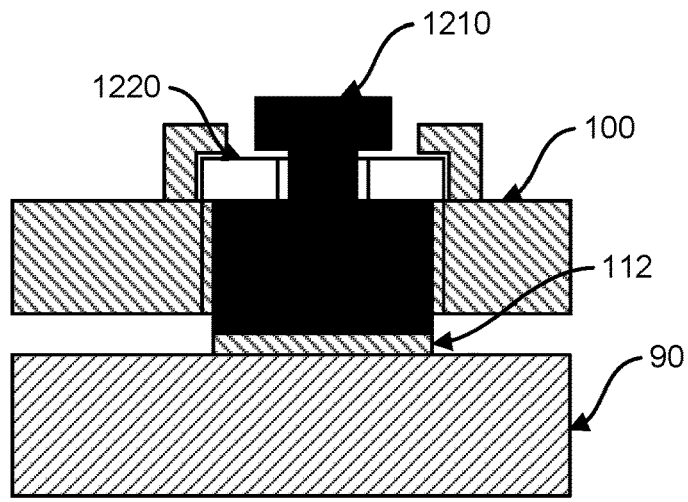
FIG. 13A illustrates an apparatus and method of attaching a case to an electronic device.
Figure 13B:
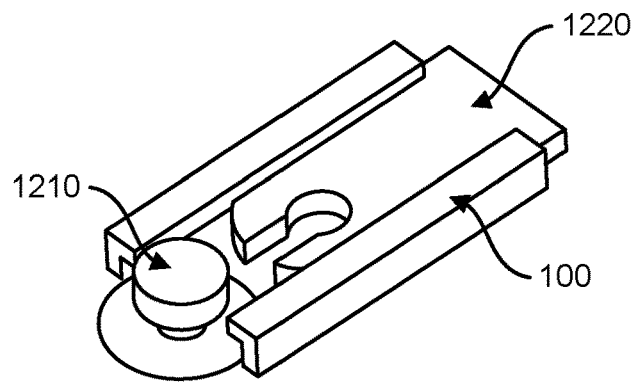
FIG. 13B illustrates a closeup view of the mechanism of FIG. 13A in the open position.
Figure 13C:
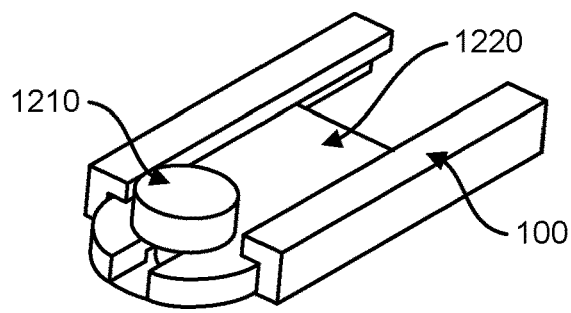
FIG. 13C illustrates a closeup view of the mechanism of FIG. 13A in the closed position.

FIGS. 13A-C illustrate a closeup, cross-sectional view of an alternate method of removably attaching case 100 to phone 90. An anchor 1210 is attached to phone 90 with adhesive 112. Anchor 1210 includes a post that extends through a port, hole, or opening in case 100. The post of anchor 1210 includes a recess, slot, or shoulder. Case 100 includes a sliding clip 1220 which engages the post of anchor 1210. FIG. 13B illustrates clip 1220 before it engages the post. FIG. 13C illustrates clip 1220 after it has engaged the post thereby retaining case 100 to phone 90. Multiple posts and clips may be used.

Figure 14A:
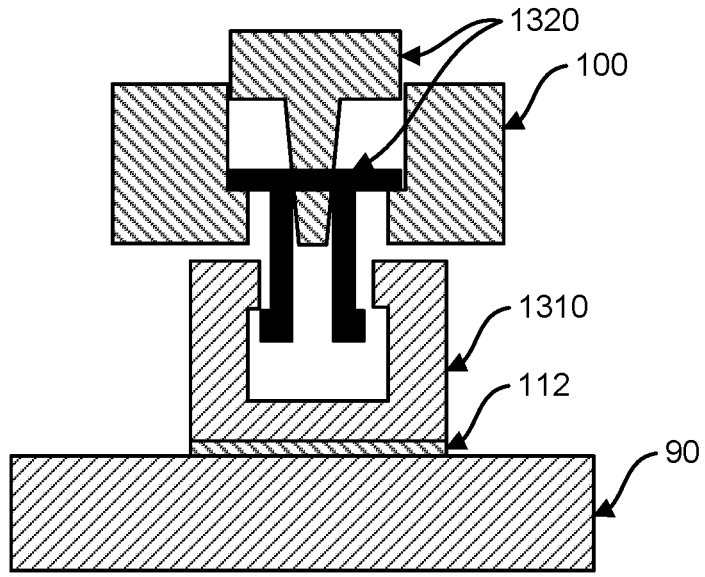
FIG. 14A illustrates an apparatus and method of attaching a case to an electronic device.
Figure 14B:
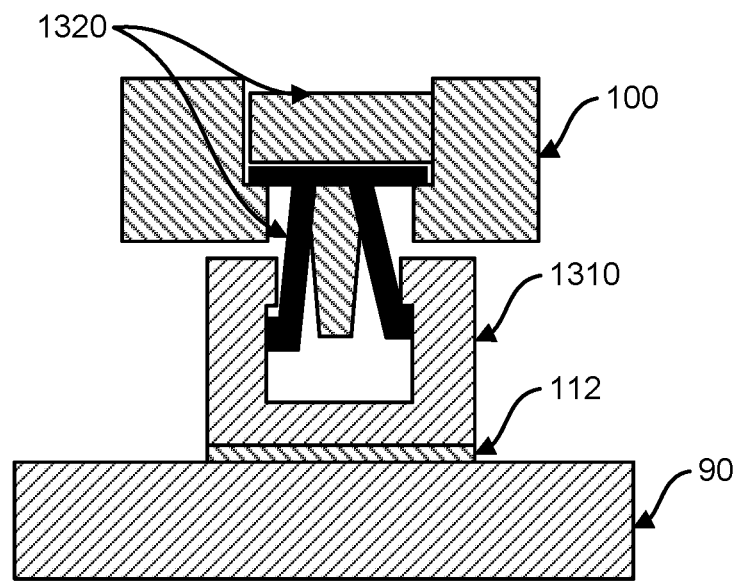
FIG. 14B illustrates the apparatus and method of FIG. 14A in the attached configuration.

FIGS. 14A-B illustrate a closeup, cross-sectional view of an alternate method of removably attaching case 100 to phone 90. An anchor 1310 is attached to phone 90 with adhesive 112. Anchor 1310 includes a cavity. Case 100 includes a hole or port through which a 2 piece clip 1320 is inserted. As illustrated in FIG. 14B, when the top of 2 piece clip 1320 is pressed down, legs expand to catch the shoulder of anchor 1310 and retain case 100 to anchor 1320, and consequently to phone 90. Multiple anchors and clips may be used.

Figure 15A:
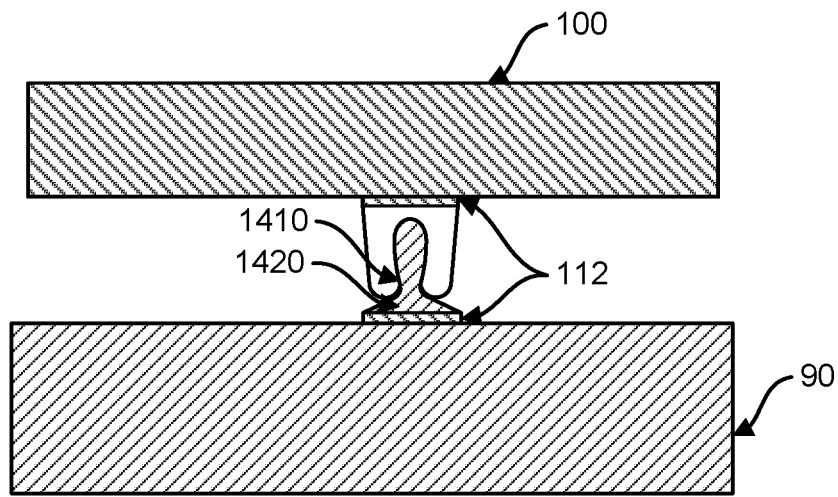
FIG. 15A illustrates an apparatus and method of attaching a case to an electronic device.
Figure 15B:
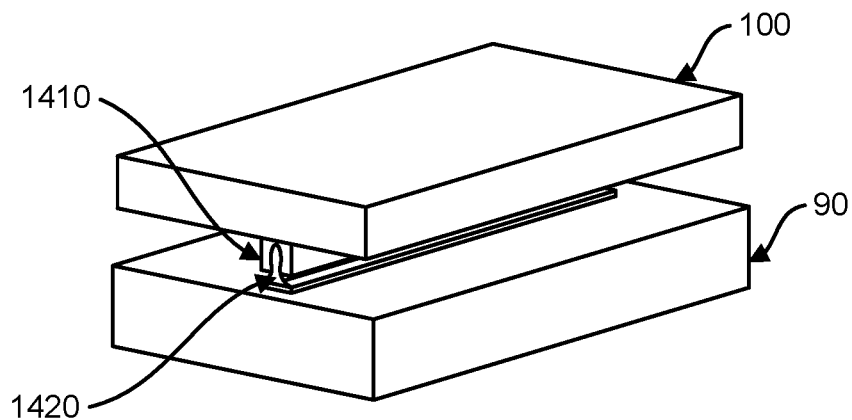
FIG. 15B illustrates an alternate view of the apparatus and method of FIG. 15A.

FIG. 15 illustrates a closeup, cross-sectional view of an alternate method of removably attaching case 100 to phone 90. The components are attached with a zip-lock or zipper mechanism. The zip-lock or zipper mechanism has a zip 1410 portion which mates with or zips to a mating zip 1420 portion. Multiple zip sections may be used in various locations.

Figure 16A:
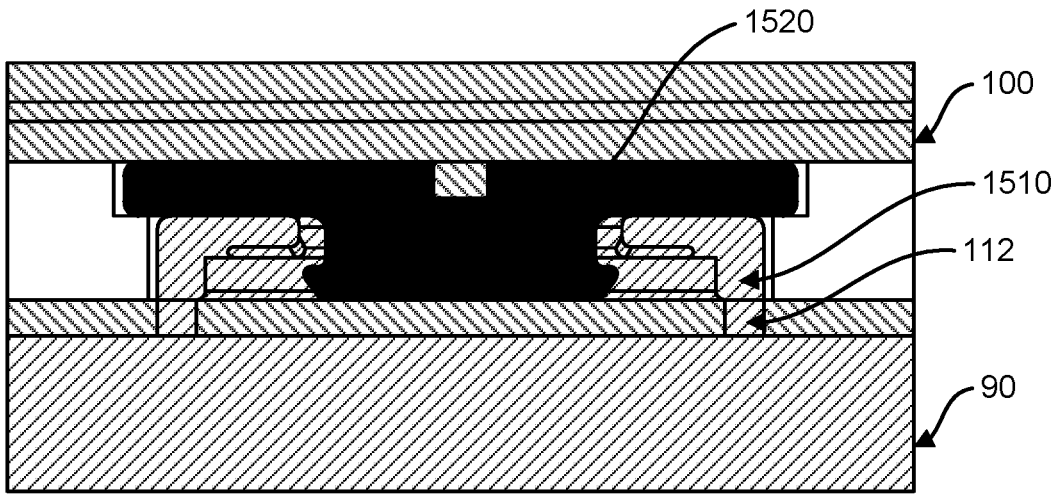
FIG. 16A illustrates an apparatus and method of attaching a case to an electronic device.
Figure 16B:
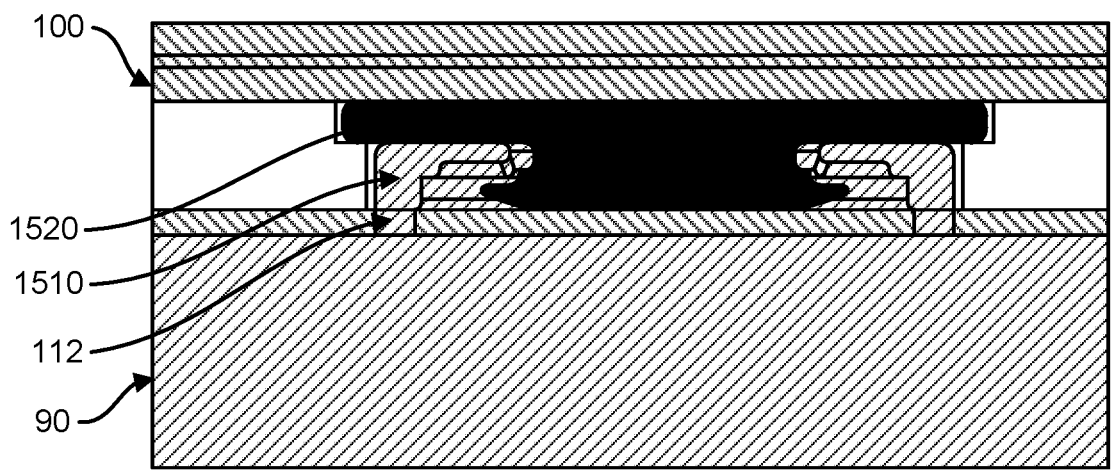
FIG. 16B illustrates the apparatus and method of FIG. 16A in the attached configuration.

FIGS. 16A-B illustrate a closeup, cross-sectional view of an alternate method of removably attaching case 100 to phone 90. An anchor 1510 is attached to phone 90 with adhesive 112. Anchor 1510 includes a cavity. Case 100 includes a hole or port in which a rotatable fastener, such as quarter turn fastener 1520, is inserted. Quarter turn fastener 1520 extends into the cavity of anchor 1510 and engages ears or lips when it is turned. FIG. 16A illustrates quarter turn fastener 1520 in a disengaged position. FIG. 16B illustrates quarter turn fastener 1520 after it has been rotated and engaged with anchor 1510 to retain case 100 to anchor 1510, and consequently to phone 90. Multiple fasteners of this type may be used.

While many examples of protective cases and method of installing or attaching them are disclosed herein, it should be understood that the features of any of the protective cases or attachment features or methods may be combined. In any of the examples, additional pads, cushions, cushioning members, compressible materials, membranes, resilient materials, tacky materials, sticky materials, and/or grippy materials may be used.

The elements, components, and steps described herein are meant to exemplify some types of possibilities. In no way should the aforementioned examples limit the scope of the invention, as they are only exemplary embodiments.

The phrases "in some embodiments," "according to some embodiments," "in the embodiments shown," "in other embodiments," "in some examples," "in other examples," "in some cases," "in some situations," "in one configuration," "in other situations," "in another configuration," and the like generally mean that the particular technique, feature, structure, or characteristic following the phrase is included in at least one embodiment of the present invention and/or may be included in more than one embodiment of the present invention. In addition, such phrases do not necessarily refer to the same embodiments or to different embodiments.

The foregoing disclosure has been presented for purposes of illustration and description. Other modifications and variations may be possible in view of the above teachings. The embodiments described in the foregoing disclosure were chosen to explain the principles of the concept and its practical application to enable others skilled in the art to best utilize the invention. It is intended that the claims be construed to include other alternative embodiments of the invention except as limited by the prior art.

What is claimed is:

1. A protective case for a foldable electronic device having a first device portion pivotably attached to a second device portion, the protective case comprising:
    a first anchor configured to be adhered to a housing of the first device portion with an adhesive, the first anchor including a slot;
    a first case portion configured to cover at least a portion of the housing of the first device portion, the first case portion including:
        a body having an aperture, wherein the first anchor is configured to extend through the aperture when the first case portion is on the housing of the first device portion; and
        a peg slidably captured in the body, wherein the peg is configured to engage the slot of the first anchor when in a latched position to removably retain the first case portion to the first device portion;
    a second anchor configured to be adhered to a housing of the second device portion with an adhesive, the second anchor including a slot; and
    a second case portion configured to cover at least a portion of the housing of the second device portion, wherein the second case portion is not attached to the first case portion, the second case portion including:
        a body having an aperture, wherein the second anchor is configured to extend through the aperture when the second case portion is on the housing of the second device portion; and
        a peg slidably captured in the body, wherein the peg is configured to engage the slot of the second anchor when in a latched position to removably retain the second case portion to the second device portion.

2. The protective case of claim 1 further comprising:
    a third anchor configured to be adhered to the housing of the first device portion with an adhesive, the third anchor including a slot, where the body of the first case portion further includes a second aperture, wherein the third anchor is configured to extend through the second aperture when the first case portion is on the housing of the first device portion; and
    a second peg slidably captured in the body of the first case portion, wherein the second peg is configured to engage the slot of the third anchor when in a latched position to further removably retain the first case portion to the first device portion.

3. The protective case of claim 2 further comprising:
    a fourth anchor configured to be adhered to the housing of the second device portion with an adhesive, the fourth anchor including a slot, where the body of the second case portion further includes a second aperture, wherein the fourth anchor is configured to extend through the second aperture when the second case portion is on the housing of the second device portion; and
    a second peg slidably captured in the body of the second case portion, wherein the second peg is configured to engage the slot of the fourth anchor when in a latched position to further removably retain the second case portion to the second device portion.

4. The protective case of claim 1 wherein the first case portion is removable from the first anchor and the first device portion when the peg of the first case portion is in an unlatched position.

5. The protective case of claim 1 wherein the first case portion further includes a cushion member positioned between the first case portion and the first device portion.

6. The protective case of claim 5 wherein the second case portion further includes a cushion member positioned between the second case portion and the second device portion.

7. A protective case for a foldable electronic device having a first device portion pivotably attached to a second device portion, the protective case comprising:
    a first anchor configured to be adhered to a housing of the first device portion with an adhesive, the first anchor including a slot;
    a first case portion configured to cover at least a portion of the housing of the first device portion, the first case portion including:
        a shell having an aperture, wherein the first anchor is configured to extend through the aperture when the first case portion is placed on the housing of the first device portion; and
        a peg slidably captured in the shell, wherein the peg is configured to engage the slot of the first anchor when in a latched position to removably retain the first case portion to the first device portion;
    a second anchor configured to be adhered to a housing of the second device portion with an adhesive, the second anchor including a slot; and a second case portion configured to cover at least a portion of the housing of the second device portion, wherein the second case portion is not attached to the first case portion, the second case portion including:
- a shell having an aperture, wherein the second anchor is configured to extend through the aperture when the second case portion is placed on the housing of the second device portion; and
- a peg slidably captured in the shell, wherein the peg is configured to engage the slot of the second anchor when in a latched position to removably retain the second case portion to the second device portion.

8. The protective case of claim 7 further comprising:
a third anchor configured to be adhered to the housing of the first device portion with an adhesive, the third anchor including a slot, where the shell of the first case portion further includes a second aperture, wherein the third anchor is configured to extend through the second aperture when the first case portion is placed on the housing of the first device portion; and
a second peg slidably captured in the shell of the first case portion, wherein the second peg is configured to engage the slot of the third anchor when in a latched position to further removably retain the first case portion to the first device portion.

9. The protective case of claim 8 further comprising:
a fourth anchor configured to be adhered to the housing of the second device portion with an adhesive, the fourth anchor including a slot, where the shell of the second case portion further includes a second aperture, wherein the fourth anchor is configured to extend through the second aperture when the second case portion is placed on the housing of the second device portion; and
a second peg slidably captured in the body of the second case portion, wherein the second peg is configured to engage the slot of the fourth anchor when in a latched position to further removably retain the second case portion to the second device portion.

10. The protective case of claim 7 wherein the first case portion is removable from the first anchor and the first device portion when the peg of the first case portion is in an unlatched position.

11. The protective case of claim 7 wherein the first case portion further includes a cushion member positioned between the first case portion and the first device portion.

12. The protective case of claim 11 wherein the second case portion further includes a cushion member positioned between the second case portion and the second device portion.

13. A case for a foldable electronic device having a first device portion foldably attached to a second device portion, the case comprising:
- a first anchor adapted to be adhered to a housing of the first device portion with an adhesive, the first anchor including a channel;
- a first case portion adapted to cover at least a portion of the housing of the first device portion, the first case portion including:
  - a body having an aperture, wherein the first anchor is adapted to extend through the aperture when the first case portion is installed on the housing of the first device portion; and
  - a peg slidably captured in the body, wherein the peg is adapted to engage the channel of the first anchor when in a latched position to removably retain the first case portion to the first device portion;
- a second anchor adapted to be adhered to a housing of the second device portion with an adhesive, the second anchor including a channel; and
- a second case portion adapted to cover at least a portion of the housing of the second device portion, wherein the second case portion is not attached to the first case portion, the second case portion including:
  - a body having an aperture, wherein the second anchor is adapted to extend through the aperture when the second case portion is installed on the housing of the second device portion; and
  - a peg slidably captured in the body, wherein the peg is adapted to engage the channel of the second anchor when in a latched position to removably retain the second case portion to the second device portion.

14. The case of claim 13 further comprising:
a third anchor adapted to be adhered to the housing of the first device portion with an adhesive, the third anchor including a channel, where the body of the first case portion further includes a second aperture, wherein the third anchor is adapted to extend through the second aperture when the first case portion is installed on the housing of the first device portion; and
a second peg slidably captured in the body of the first case portion, wherein the second peg is adapted to engage the channel of the third anchor when in a latched position to further removably retain the first case portion to the first device portion.

15. The case of claim 14 further comprising:
a fourth anchor adapted to be adhered to the housing of the second device portion with an adhesive, the fourth anchor including a channel, where the body of the second case portion further includes a second aperture, wherein the fourth anchor is adapted to extend through the second aperture when the second case portion is installed on the housing of the second device portion; and
a second peg slidably captured in the body of the second case portion, wherein the second peg is adapted to engage the channel of the fourth anchor when in a latched position to further removably retain the second case portion to the second device portion.

16. The case of claim 15 further comprising a fifth anchor.

17. The case of claim 13 wherein the first case portion is removable from the first anchor and the first device portion when the peg of the first case portion is in an unlatched position.

18. The case of claim 13 wherein the first case portion further includes a cushion member positioned between the first case portion and the first device portion.

19. The case of claim 18 wherein the second case portion further includes a cushion member positioned between the second case portion and the second device portion.

20. The case of claim 13 wherein the body of the first case portion and the body of the second case portion comprise polycarbonate.

* * * * *